March 27, 1951     C. K. SHOOK     2,546,790
AUTOMOBILE PEN AND CHAIR FOR CHILDREN
Filed Oct. 20, 1947
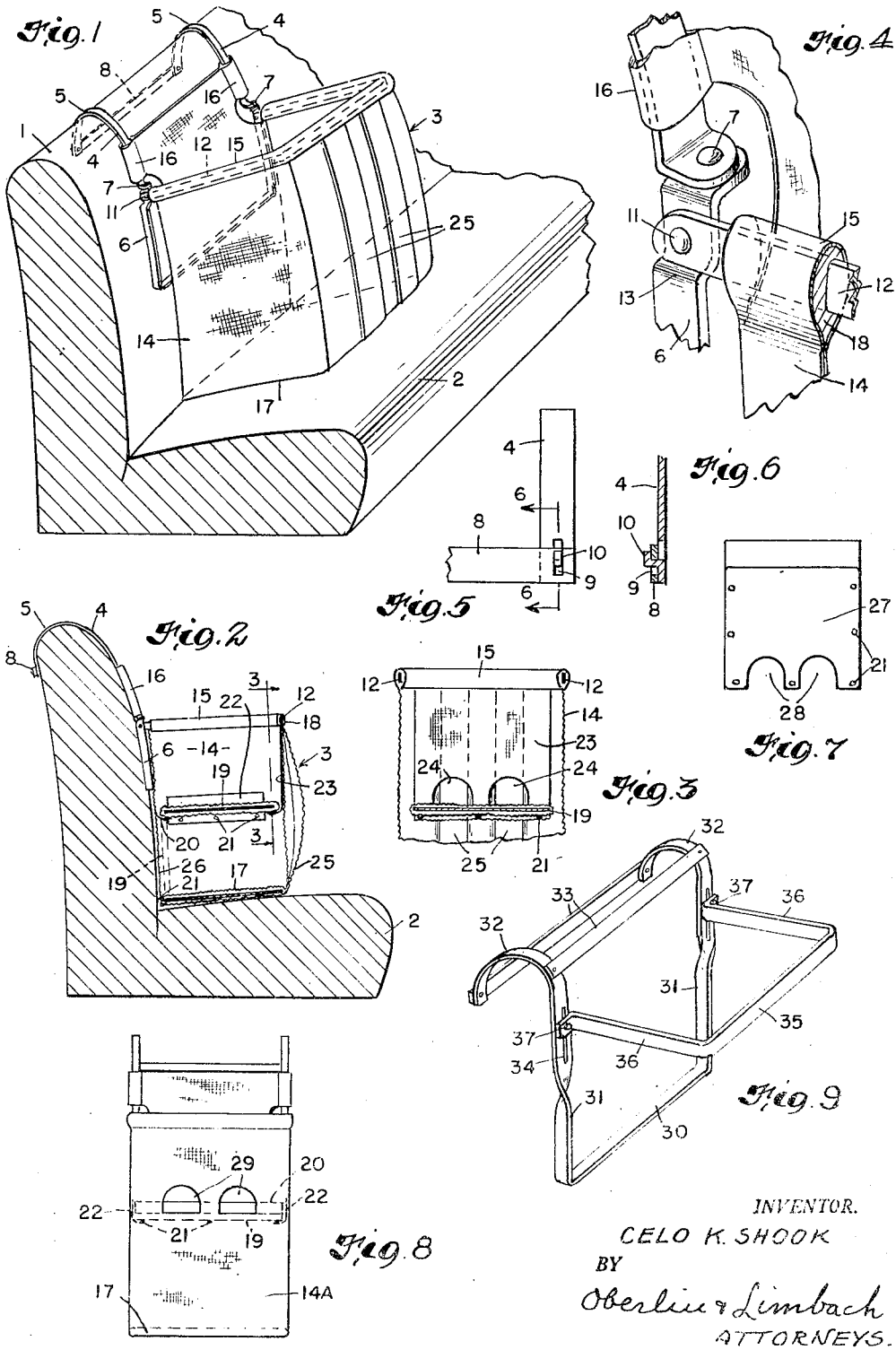
INVENTOR.
CELO K. SHOOK
BY
Oberlin & Limbach
ATTORNEYS.

Patented Mar. 27, 1951

2,546,790

UNITED STATES PATENT OFFICE 2,546,790

AUTOMOBILE PEN AND CHAIR FOR CHILDREN

Celo K. Shook, Berea, Ohio

Application October 20, 1947, Serial No. 780,938

11 Claims. (Cl. 155—11)

1

The present invention relates to a device which is particularly adapted for use in an automobile, bus, train or like vehicle for safely carrying a child therein in either a standing or a seated position as desired, said device when used in an automobile being mountable with equal facility either on the rear seat or on the front seat alongside the driver.

One of the primary objects of this invention is to provide a device which is so formed that a child placed therein, while having considerable freedom of action, is safe therein with regard to the possibility of falling out and injury resulting from jolts, sudden stops, sharp turns or the like incident to the normal operation of the automobile.

Another object of this invention is to provide a device which is readily adjustable in height so as to bring the marginal edge of the open upper end to approximately the chest height of a child placed therein in a standing position.

Still another object of this invention is to provide a device which may be readily converted from a pen into a chair, said device being provided with novel means for forming spaces for the legs of a child seated therein.

Still another object of this invention is to provide a device of the character indicated which may be folded to a compact form for facilitating transportation of the same, as for example, from one vehicle to another.

Other objects and advantages will become apparent as the following description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In the drawings:

Fig. 1 is a perspective view of a portion of a typical automobile seat with the device constituting the present invention hooked over such seat in condition for use;

Fig. 2 is a central vertical cross-section view of the device as converted to use as a chair;

Fig. 3 is a vertical cross-section view taken along the line 3—3, Fig. 2, illustrating one manner of providing leg openings for a child adapted to be seated in the device;

Fig. 4 is a perspective view on an enlarged scale of one of the rear corners of the device illustrating a jointed frame structure which enables folding of the device to compact flat form;

Fig. 5 is a rear elevation view of one of the hooked supports of the device;

Fig. 6 is a cross-section view taken along line 6—6, Fig. 5;

Fig. 7 is a plan view of a modified form of seat which has cutouts formed therein for the legs of a child adapted to be seated thereon;

Fig. 8 is a front elevation view of a still different form of structure which makes provision for the legs of a child seated therein; and, Fig. 9 is a perspective view of the frame structure only of a device incorporating adjusting means whereby the device may be adjusted so that the upper marginal edge thereof corresponds with the chest height of a child adapted to be carried therein.

Referring now to the drawing in which like numerals in the several figures designate like parts and first to Figs. 1 to 6, there is shown therein a typical automobile seat which comprises a generally vertically disposed back cushion 1 and a generally horizontally disposed seat cushion 2. Hooked over the top of the back cushion 1 is the combination pen and chair device generally designated by the numeral 3, said device including a pair of supports 4, each of which is formed with a hook 5 fitted over the top of cushion 1. Said supports are preferably fabricated from strap iron or the like.

As best shown in Figs. 1 and 4, the lower ends of the supports 4 are connected to the free ends of a generally U-shaped member 6 as by the rivets 7 for pivotal movement about a vertically disposed axis whereby the hooked ends 5 of said supports may be swung inwardly toward one another so as to occupy a minimum amount of space when the device is not in use. On the other hand, when the device is in use a brace member 8 is preferably employed to hold the supports in the position shown in Fig. 1 and thus preclude the possibility of either of the supports becoming dislodged from engagement over the top of the back cushion 1 and from sliding between the two back cushions commonly provided in tudor sedans and so-called sedan coupés. One illustrative manner of connecting brace 8 to said supports is clearly shown in Figs. 5 and 6 wherein said brace is formed with slots 9 therethrough fitted over lugs 10 struck out from the supports, said lugs preferably yieldably engaging said brace to thus hold it in position on the supports. Said brace as shown holds the hooked ends 5 of said supports in substantially parallel relation to one another.

Also pivotally connected as by the rivets 11 to the free ends of member 6 for swinging movement about a generally horizontally disposed axis is the U-shaped frame member 12 (see Figs. 1 and 4), said member 6 being formed with an offset or ledge portion 13 which engages the lower edge of said frame member 12 to position the latter so that it is inclined slightly upwardly and forwardly as shown in Figs. 1 and 2 when the device is placed over a seat for use. Such positioning of frame member 12 serves to better retain a child within the device even though the child holds on to and rests his weight upon said frame member 12. It will be apparent that when the device is not in use said frame member 12 may be swung upwardly in a counter-clockwise direction as viewed in Figs. 1, 2 and 4 whereby said frame member 12, supports 4 and member 6 will all lie in a common plane.

Depending downwardly from frame member 12 is a sack-like skirt or curtain 14 of cloth or like flexible material formed with a hem 15 about said frame member 12 and with other hems 16 about said supports 4. The rear wall of said skirt which lies against back cushion 1 of the automobile seat may, as later explained, be either of double thickness for a portion of its extent or simply of single thickness with a flexible strip sewed thereto to form a hinge for a seat disposed within said skirt.

The closed lower end of said skirt constitutes a floor for the device, said floor preferably consisting of a cloth-covered pasteboard panel 17 or the like which provides a relatively rigid floor over the soft deformable seat cushion 2 therebelow. The distance from the upper ends of supports 4 to the floor 17 is such that the floor rests on the seat cushion 2. Adjustment of the frame member 12 to any desired height between a pre-selected maximum and minimum from the floor 17 may be accomplished as by reforming the hooked ends 5 of the supports 4, said supports being of sufficient length to make possible such adjustment. The height of skirt 14 is preferably such that for all adjustments of the height of frame member 12 from floor 17 the latter will always rest upon the seat 2. To avoid injury to a child placed within said skirt there is padding material 18 within hem 15 and surrounding frame member 12.

From the structure thus far described, it will be apparent that a child standing in the device is safely retained therein. Furthermore, the child has considerable freedom of action in that he or she may move about therein and have a complete view in all directions.

In order to convert the device from a pen as above described into a chair, a seat 19 is mounted within the skirt 14 for swinging movement between the dotted and solid line positions of Fig. 2, such swingable mounting consisting of a free lower end of the material formed with the hems 16 secured to the seat 19, or alternatively of a flexible strip 20 as shown secured to the seat and sewed to the rear wall of the skirt. Suitable snaps 21 are employed for releasably holding the seat in the generally horizontal position of Fig. 2, the complementary elements of said snaps being respectively secured to the front and side portions of the seat and to flexible strips 22 sewed to the side walls of the skirt and to a flexible web 23 depending downwardly from the front portion of the frame member 12.

Said web 23 as shown in Fig. 3 is formed with a pair of openings 24 therethrough disposed just above said seat 19 whereby the legs of a child seated on said seat may be projected through such openings and dangle downwardly toward the floor 17. In order to form a space for the legs in front of the front edge of said seat, the front wall of the skirt is formed with vertically extending pleats 25 which unfold to the position shown in Fig. 2 when a child is seated on seat 19. Said pleats 25 assume a generally flat folded position as shown in Fig. 1 when the device is used as a pen to carry a child therein in a standing position.

To facilitate cleaning of floor 17 and the snapping of seat 19 in the generally horizontal position of Fig. 2, the bottom portion of the rear wall of skirt 14 has a flap 26 which normally closes an opening in such rear wall as by cooperating snap elements 21 on said flap and floor. When it is desired to reach into the skirt from such rear wall opening the snaps 21 are merely opened whereby flap 26 may be swung to the dotted position shown in Fig. 2.

In the form of seat 27 illustrated in Fig. 7 the frontal edge thereof is formed with cutouts 28 for thus defining with the skirt 14 a pair of openings for accommodating the legs of a child seated on said seat. With this form of seat the pleats 25 in the skirt may be omitted if desired and the web 23 replaced by a strip 22 or the like sewed to the front wall of the skirt.

In another form of the invention as illustrated in Fig. 8, leg openings 29 are formed in the skirt 14A at a level just above the seat 19. In this case the legs of the child will dangle exteriorly of said skirt 14A.

In Fig. 9 there is illustrated a novel form of frame structure which makes possible desired vertical adjustment of the distance between the seat cushion 2 and the upper open end of the skirt. The skirt which may be any of those disclosed has been omitted from Fig. 9 for sake of clarity. In essence this frame structure comprises a U-shaped frame member 30 of strap iron or the like with the parallel legs 31 thereof formed with hooks 32 adapted for hooking over the top of the back cushion 1 of an automobile seat in the manner disclosed in Fig. 1. Said frame member 30 is rendered relatively rigid by means of the braces 33 extending between the hooks 32 and welded or otherwise secured to such hooks. The legs 31 are each formed with a vertically extending elongated slot 34 therethrough. The generally horizontally disposed U-shaped member 35 which corresponds to member 12 as described above in connection with Figs. 1 to 8 has openings formed in the free ends of its legs 36 and suitable nuts and screws 37 are employed to adjustably secure the member 35 at any desired height relative to the seat cushion of the seat over which said device is adapted to be hooked. It is apparent that the skirt to be suspended from member 35 should be of a height generally corresponding with the vertical distance between the upper surface of the seat cushion 2 and the upper ends of slots 34 in frame member 30 whereby the floor of the skirt will always rest upon such seat cushion regardless of the position to which said member 35 is adjusted along such slots.

In summary, it can be seen that I have provided an extremely simple device which can be inexpensively manufactured, readily mounted onto and removed from an automobile seat, readily adjusted to proper height, and selectively used either as a pen or as a chair.

Other modes of applying the principle of the invention may be employed, change being made as regards the details described, provided the features stated in any of the following claims or the equivalent of such be employed.

I, therefore, particularly point out and distinctly claim as my invention:

1. In a device of the character described, the combination of a generally vertically disposed support formed with a hook at its upper end adapted to be fitted over the back cushion of an automobile seat or the like, a frame member projecting forwardly from said support, a skirt open at its upper end depending downwardly from said frame member, a floor closing the bottom end of said skirt adapted to rest upon the seat cushion of such seat, and a seat member within said skirt swingably mounted on said skirt for movement from a generally vertical position to a generally horizontal position parallel to said floor, and means releasably securing said seat member in such latter position.

2. In a device of the character described, the combination of a generally vertically disposed support formed with a hook at its upper end adapted to be fitted over the back cushion of an automobile seat or the like, a frame member projecting forwardly from said support, a skirt open at its upper end depending downwardly from said frame member, a floor closing the bottom end of said skirt adapted to rest upon the seat cushion of such seat, and a seat member within said skirt swingably mounted on said skirt for movement from a generally vertical position to a generally horizontal position parallel to said floor, means releasably securing said seat member in such latter position, said skirt being formed with a vertically extending pleat in front of an edge of said seat member when in such latter position whereby to provide a space between such edge of said seat member and said skirt for the legs of a child adapted to be seated on said seat member.

3. In a device of the character described, the combination of a generally vertically disposed support formed with a hook at its upper end adapted to be fitted over the back cushion of an automobile seat or the like, a frame member projecting forwardly from said support, a skirt open at its upper end depending downwardly from said frame member, a floor closing the bottom end of said skirt adapted to rest upon the seat cushion of such seat, and a seat member within said skirt swingably mounted on said skirt for movement from a generally vertical position to a generally horizontal position parallel to said floor, and snap means on said skirt and seat member operative to releasably hold said seat member in such horizontal position.

4. In a device of the character described, the combination of a generally vertically disposed support formed with a hook at its upper end adapted to be fitted over the back cushion of an automobile seat or the like, a frame member projecting forwardly from said support, a skirt having a rear wall, side walls, and a front wall, and open at its upper end depending downwardly from said frame member, a floor closing the bottom end of said skirt adapted to rest upon the seat cushion of such seat, a seat member within said skirt having its rear edge connected to the rear wall of said skirt for pivotal movement from a generally vertical hanging position adjacent such rear wall to a generally horizontal position parallel to said floor, a web depending downward from said frame member behind such front wall of said skirt, and interengaging elements on said web and the front edge of said seat member operative to releasably hold said seat member in such horizontal position.

5. In a device of the character described, the combination of a generally vertically disposed support formed with a hook at its upper end adapted to be fitted over the back cushion of an automobile seat or the like, a frame member projecting forwardly from said support, a skirt having a rear wall, side walls, and a front wall, and open at its upper end depending downwardly from said frame member, a floor closing the bottom end of said skirt adapted to rest upon the seat cushion of such seat, a seat member within said skirt having its rear edge connected to the rear wall of said skirt for pivotal movement from a generally vertical hanging position adjacent such rear wall to a generally horizontal position parallel to said floor, a web depending downward from said frame member behind such front wall of said skirt, and interengaging elements on said web and the front edge of said seat member operative to releasably hold said seat member in such horizontal position, said web being formed with an opening therethrough for the legs of a child adapted to be seated on said seat member.

6. In a device of the character described, the combination of a generally vertically disposed support formed with a hook at its upper end adapted to be fitted over the back cushion of an automobile seat or the like, a frame member projecting forwardly from said support, a skirt having a rear wall, side walls, and a front wall, and open at its upper end depending downwardly from said frame member, a floor closing the bottom end of said skirt adapted to rest upon the seat cushion of such seat, a seat member within said skirt having its rear edge connected to the rear wall of said skirt for pivotal movement from a generally vertical hanging position adjacent such rear wall to a generally horizontal position parallel to said floor, a web depending downward from said frame member behind such front wall of said skirt, and interengaging elements on said web and the front edge of said seat member operative to releasably hold said seat member in such horizontal position, said web being formed with an opening therethrough for the legs of a child adapted to be seated on said seat member and said skirt being formed with a vertically extending pleat in its front wall which unfolds to provide a space between said web and such front wall opposite such opening in said web.

7. In a device of the character described, the combination of a pair of vertically disposed supports each formed with a hook at its upper end adapted to be fitted over the back cushion of an automobile seat or the like, a U-shaped member having its free ends pivotally connected to the lower ends of said supports whereby said supports may be swung to a position with such hooks lying in a common plane, another U-shaped member having its free ends pivotally connected to the free ends of said first U-shaped member for movement of said another U-shaped member between generally horizontal and vertical positions, a skirt depending downwardly from said another U-shaped member when the latter is in such generally horizontal position, and a floor at the lower end of said skirt adapted to rest upon the seat cushion of such seat.

8. In a device of the character described, the combination of a pair of vertically disposed supports each formed with a hook at its upper end adapted to be fitted over the back cushion of an automobile seat or the like, a U-shaped member having its free ends pivotally connected to the lower ends of said supports whereby said supports may be swung to a position with such hooks lying in a common plane, another U-shaped member having its free ends pivotally connected to the free ends of said first U-shaped member for movement of said another U-shaped member between generally horizontal and vertical positions, a skirt depending downwardly from said another U-shaped member when the latter is in such generally horizontal position, and a floor at the lower end of said skirt adapted to rest upon the seat cushion of such seat, said U-shaped members being formed with interengaging surfaces limiting downward movement of said another U-shaped member to such horizontal position.

9. In a device of the character described, the combination of a pair of vertically disposed supports each formed with a hook at its upper end adapted to be fitted over the back cushion of an automobile seat or the like, a U-shaped member having its free ends pivotally connected to the lower ends of said supports whereby said supports may be swung to a position with such hooks lying in a common plane, another U-shaped member having its free ends pivotally connected to the free ends of said first U-shaped member for movement of said another U-shaped member between generally horizontal and vertical positions, a skirt depending downwardly from said another U-shaped member when the latter is in such generally horizontal position, a floor at the lower end of said skirt adapted to rest upon the seat cushion of such seat, and a brace extending between such hooks and removably secured to such hooks operative to hold such hooks in parallel relation over the back cushion of such seat.

10. In a device of the character described, the combination of a generally U-shaped member including vertically disposed parallel legs formed with hooks at their free ends adapted to be fitted over the back cushion of an automobile or like seat, each of such legs being formed with an elongated vertically disposed slot, another U-shaped member having an opening through each of its free ends, connecting means through such slots and openings in said U-shaped members vertically adjustably securing said another U-shaped member on said first U-shaped member, a skirt depending downwardly from said another U-shaped member, and a floor closing the lower end of said skirt adapted to rest upon the seat cushion of such seat.

11. In a device of the character described, the combination of a generally U-shaped member including parallel vertically disposed legs formed with hooks at their free ends adapted to be fitted over the back cushion of an automobile or like seat, each of such legs being formed with an elongated vertically disposed slot, another U-shaped member having an opening through each of its free ends, connecting means through such slots and openings in said U-shaped members vertically adjustably securing said another U-shaped member on said first U-shaped member, a skirt depending downwardly from said another U-shaped member, a floor closing the lower end of said skirt adapted to rest upon the seat cushion of such seat, and a brace extending from one of such hooks to the other and respectively secured to each hook.

CELO K. SHOOK.

REFERENCES CITED

The following references are of record in the file of this patent:

UNITED STATES PATENTS

| Number | Name | Date |
|---|---|---|
| D. 140,503 | Geluso | Mar. 6, 1945 |
| 839,944 | Martin | Jan. 1, 1907 |
| 1,060,637 | Sawyer | May 6, 1913 |
| 1,351,746 | Eberle | Sept. 7, 1920 |
| 2,359,599 | Allen | Oct. 3, 1944 |

FOREIGN PATENTS

| Number | Country | Date |
|---|---|---|
| 293,132 | Great Britain | July 2, 1928 |